(12) United States Patent
Fowler

(10) Patent No.: US 12,336,591 B1
(45) Date of Patent: Jun. 24, 2025

(54) OUTSOLE HAVING CORK OVERLAY AND METHOD OF MAKING SAME

(71) Applicant: Guntersville Breathables, Inc., Arab, AL (US)

(72) Inventor: Hunter Chase Fowler, Arab, AL (US)

(73) Assignee: Guntersville Breathables, Inc., Arab, AL (US)

( * ) Notice: Subject to any disclaimer, the term of this patent is extended or adjusted under 35 U.S.C. 154(b) by 0 days.

(21) Appl. No.: 18/425,738

(22) Filed: Jan. 29, 2024

(51) Int. Cl.
  *A43B 13/12* (2006.01)
  *A43B 13/04* (2006.01)
  *A43B 13/08* (2006.01)

(52) U.S. Cl.
  CPC ............ *A43B 13/125* (2013.01); *A43B 13/04* (2013.01); *A43B 13/08* (2013.01); *A43B 13/122* (2013.01)

(58) Field of Classification Search
  CPC ....... A43B 13/125; A43B 13/04; A43B 13/08; A43B 13/122
  See application file for complete search history.

(56) References Cited

U.S. PATENT DOCUMENTS

| | | | |
|---|---|---|---|
| 2,139,260 A * | 12/1938 | Cuozzo | A43B 7/1425 36/76 R |
| 2,352,148 A | 6/1944 | Elkin, Jr. et al. | |
| 2,598,296 A | 5/1952 | Pierson | |
| 2,598,297 A | 5/1952 | Pierson | |
| 3,228,124 A | 1/1966 | Hermann | |
| 3,233,348 A * | 2/1966 | Gilkerson | A43B 7/141 36/44 |
| 3,445,874 A | 5/1969 | Brauner | |
| 3,722,113 A | 3/1973 | Birkenstock | |
| 3,872,531 A | 3/1975 | Torrents | |
| 4,053,995 A | 10/1977 | Shein | |
| 4,831,750 A | 5/1989 | Mueller | |
| 5,359,791 A | 11/1994 | Prahl et al. | |
| 6,014,822 A | 1/2000 | Smith | |
| 6,065,229 A | 5/2000 | Wahrheit | |
| 6,205,685 B1 * | 3/2001 | Kellerman | A43D 999/00 36/44 |
| 6,346,210 B1 * | 2/2002 | Swartz | A43D 1/022 264/487 |
| 6,681,502 B1 | 1/2004 | Birkenstock | |
| 7,191,549 B2 | 3/2007 | Koo | |
| 7,203,985 B2 | 4/2007 | Cox et al. | |
| 7,211,211 B2 | 5/2007 | Herber et al. | |

(Continued)

*Primary Examiner* — Bao-Thieu L Nguyen
(74) *Attorney, Agent, or Firm* — C. Brandon Browning; Maynard Nexsen PC

(57) ABSTRACT

A method of making footwear outsoles including providing a laminate including a cork layer and a textile layer, cutting the laminate into an overlay having a desired shape, placing the overlay into a sole mold with the cork layer arranged in direct contact with a first surface of the sole mold, the first surface including a plurality of protrusions configured for forming an outsole tread pattern, and placing a polymer sheet into the sole mold with the polymer sheet arranged adjacent to and in direct contact with the textile layer. The overlay and polymer sheet are compressed between the first surface and a second surface of the sole mold in the presence of heat whereby the laminate is bonded with and overlays the polymer sheet to form an outsole displaying at least a portion of the outsole tread pattern across the cork and polymer portions of the outsole.

12 Claims, 4 Drawing Sheets

(56) References Cited

U.S. PATENT DOCUMENTS

| | | |
|---|---|---|
| 7,516,506 B2 | 4/2009 | Koo et al. |
| 7,700,021 B2 | 4/2010 | Cox et al. |
| 7,713,457 B2 | 5/2010 | Koo |
| 7,827,640 B2 | 11/2010 | Koo et al. |
| 8,197,734 B1 | 6/2012 | Koo |
| 8,197,736 B2 * | 6/2012 | Frasson ............... A43B 13/24 |
| | | 264/254 |
| 8,234,736 B2 | 8/2012 | Koo et al. |
| 8,414,810 B1 | 4/2013 | Koo |
| 8,590,176 B1 | 11/2013 | Cox et al. |
| 8,591,790 B2 | 11/2013 | Cox et al. |
| 8,608,996 B2 | 12/2013 | Koo |
| 8,647,460 B1 | 2/2014 | Koo |
| 8,661,593 B2 | 3/2014 | Koo et al. |
| 8,661,713 B2 | 3/2014 | Koo et al. |
| 8,808,487 B1 | 8/2014 | Koo |
| 8,984,769 B1 | 3/2015 | Cox et al. |
| 9,049,900 B1 * | 6/2015 | Cox ................... A43B 1/0027 |
| 9,078,492 B2 | 7/2015 | Koo |
| 9,089,999 B2 * | 7/2015 | Dean ..................... B29C 64/124 |
| 9,226,546 B1 | 1/2016 | Cox et al. |
| 9,414,643 B2 | 8/2016 | Koo et al. |
| 9,538,814 B2 | 1/2017 | DelCielo |
| 9,662,242 B2 | 5/2017 | Levine |
| 9,894,955 B2 | 2/2018 | Koo et al. |
| 10,306,945 B2 | 6/2019 | Koo et al. |
| 11,109,640 B2 | 9/2021 | Koo et al. |
| 11,653,713 B2 | 5/2023 | Koo et al. |
| 2003/0009919 A1 * | 1/2003 | Stein ..................... A43B 13/26 |
| | | 36/59 R |
| 2003/0121179 A1 * | 7/2003 | Chen ..................... B29D 35/142 |
| | | 36/32 R |
| 2005/0198859 A1 * | 9/2005 | Basso ..................... A43B 7/08 |
| | | 36/3 B |
| 2007/0271713 A1 * | 11/2007 | Koo ..................... B29D 35/142 |
| | | 12/146 B |
| 2008/0229625 A1 * | 9/2008 | Frasson ............... A43B 13/24 |
| | | 12/146 B |
| 2009/0265954 A1 | 10/2009 | Goldberg |
| 2010/0186258 A1 | 7/2010 | Garza |
| 2011/0099853 A1 * | 5/2011 | DelCielo ............. B29D 35/142 |
| | | 12/146 B |
| 2011/0113647 A1 | 5/2011 | Levine |
| 2014/0144046 A1 | 5/2014 | Bhambhani |
| 2015/0033580 A1 | 2/2015 | Koo et al. |
| 2017/0325989 A1 | 11/2017 | Levine |
| 2021/0244129 A1 | 8/2021 | Boehler |
| 2021/0245467 A1 | 8/2021 | Ha |
| 2022/0053886 A1 | 2/2022 | Bramani |
| 2022/0369767 A1 * | 11/2022 | Torres ..................... A43B 21/24 |
| 2023/0232937 A1 * | 7/2023 | Koo ..................... A43B 1/06 |
| | | 36/83 |
| 2023/0329391 A1 * | 10/2023 | Park ..................... B29D 35/142 |

\* cited by examiner

OUTSOLE HAVING CORK OVERLAY AND METHOD OF MAKING SAME

FIELD OF INVENTION

The present invention is directed to footwear, and more particularly, to a shoe or boot outsole having a cork overlay forming a tread pattern and method of making same.

BACKGROUND OF INVENTION

Footwear having an outsole including cork is known in the art. For example, U.S. Pat. No. 9,538,814 to DelCielo discloses a method for fabricating foot wear having a sole with a cork insert, the method including adhering a thin fabric sheet to one side of an intermediate cork sheet, cutting sole patterns out of the cork/fabric sheet and inserting the cork/fabric sole pattern into a sole mold. An injection material such as rubber is injected into the mold thereby producing an outsole surface including a first portion of cork having a flat exposed surface and a second portion of the injection material adjacent the exposed cork with the fabric surface is disposed between the first portion of exposed cork and an interior portion of the injectable material that is bonded to the fabric surface.

SUMMARY OF THE INVENTION

The present invention is directed to a method of making footwear having an outsole with a cork overly exhibiting a desired tread pattern. The method includes providing a laminate including a natural cork layer and a textile layer, placing the laminate into a sole mold with the cork layer arranged adjacent to and in direct contact with a first surface of the sole mold, the first surface including a plurality of protrusions configured for forming an outsole tread pattern, and placing a polymer sheet, such as a rubber sheet or a plastic sheet, into the sole mold with the polymer sheet arranged adjacent to and in direct contact with the textile layer. The laminate and polymer sheet are compressed between the first surface and a second surface of the sole mold in the presence of heat whereby the laminate is bonded with and overlays the polymer sheet to form an outsole displaying at least a portion of the outsole tread pattern across the cork and polymer portions of the outsole. In certain instances, one or more of the protrusions of the plurality of protrusions of the mold surface may pass through the cork layer of the laminate during compression of the laminate and polymer sheet. In other instances, the one or more of the protrusions of the plurality of protrusions of the mold surface do not pass through the cork layer of the laminate during compression of the laminate and polymer sheet whereby the cork layer forms around the protrusions thereby exhibiting the entirety of the tread pattern. A colored finish may applied to the outsole such that cork and polymer portions exhibit the same color. Following fabrication, the outsole is operatively coupled to a footwear upper by means known on the art to form footwear such as shoes, boots, sandals and wader boots.

According to another aspect of the invention, there is provided a method of making footwear including providing an outsole mold having a first mold surface and a second mold surface, the first mold surface including a plurality of protrusions configured for forming an outsole tread pattern. The protrusions may be substantially rectangular, square, spherical, elongated, rod shaped, convex, triangular, or cone-shaped and have sharp or curved edges. A sheet of compressed natural cork is placed into the outsole mold with the sheet of compressed natural cork adjacent to and in direct contact with the first mold surface, the sheet of compressed natural cork having a woven textile backing adhered thereto. Thereafter, polymer sheet is placed into the mold with the polymer sheet adjacent to and in direct contact with the woven textile backing and a portion of the first mold surface. The sheet of compressed natural cork, the woven textile backing and the polymer sheet are compressed and heated between the first mold surface and the second mold surface thereby forming an outsole displaying the outsole tread pattern across the sheet of compressed natural cork and the polymer sheet with the sheet of compressed natural cork imparting a rough texture surface portion to the outsole.

According to yet another aspect of the invention there is provided a method of making footwear including placing a laminate into a sole mold with a cork layer of the laminate arranged adjacent to and in direct contact with a first mold surface of the sole mold, the first surface including a plurality of protrusions configured for forming an outsole tread pattern. A polymer is then placed into the sole mold with the polymer entirely covering and in direct contact with a textile layer of the laminate and covering at least 90% of the first mold surface. The laminate and the polymer are compressed and heated between the first surface and a second surface of the sole mold thereby forming an outsole, wherein the cork layer of the laminate displays at least a portion of the outsole tread pattern.

BRIEF DESCRIPTION OF THE DRAWINGS

The following detailed description of the present invention may be better understood, by way of example only, with reference to the following drawings. The elements of the drawings are not necessarily to scale relative to each other, emphasis being placed upon clearly illustrating the principles of the disclosure. Furthermore, like reference numerals designate corresponding features in several views or insets.

DETAILED DESCRIPTION OF THE INVENTION

Figure 1:
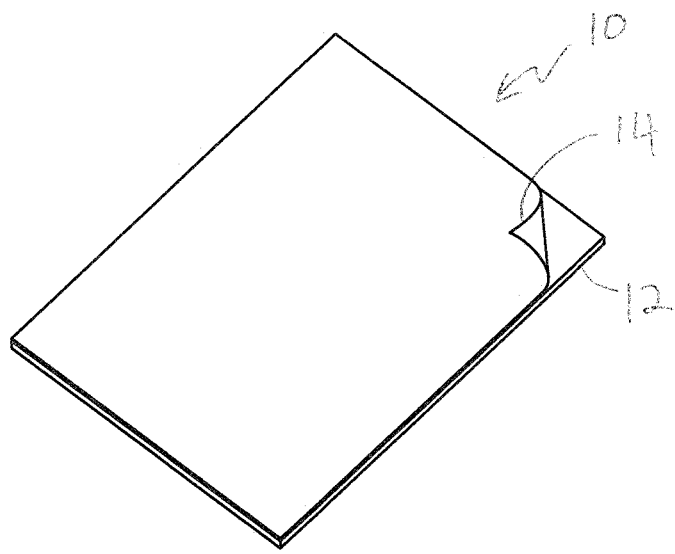
FIG. 1 is a perspective view a laminate including a compressed natural cork sheet adhered to a textile sheet in accordance with the present invention.
Figure 2:
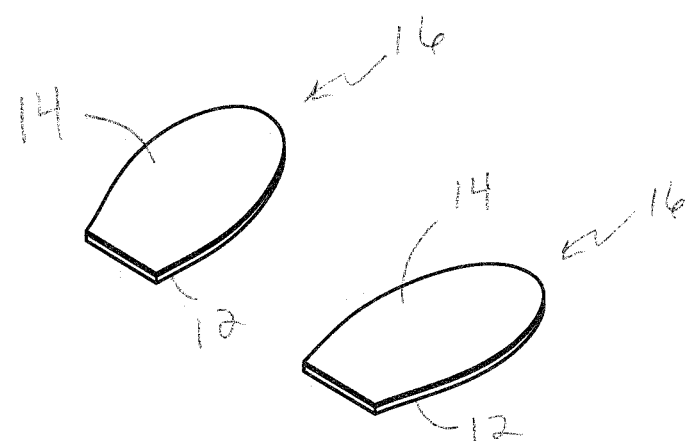
FIG. 2 is a perspective view of an outsole overlay fabricated from the laminate of FIG. 1.
Figure 3:
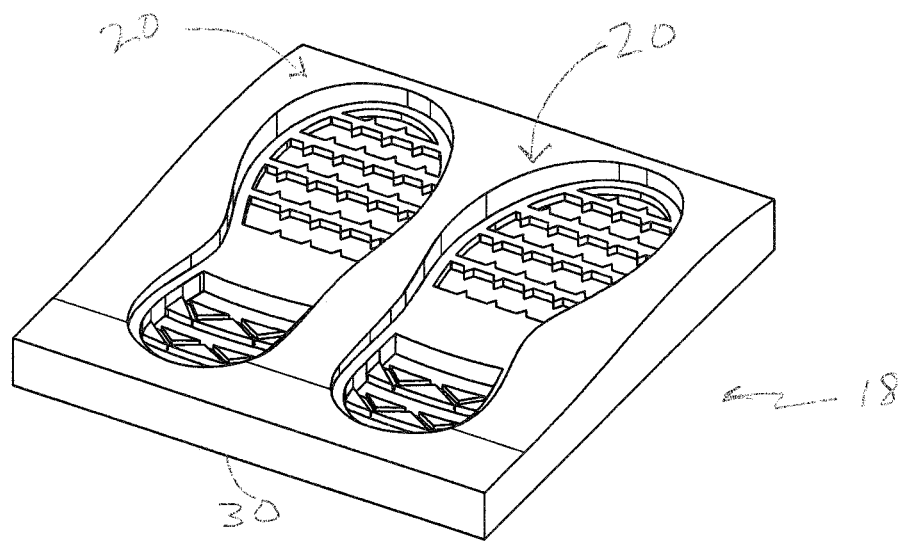
FIG. 3 is a perspective view of an outsole mold with a surface exhibiting a shoe tread pattern.
Figure 4:
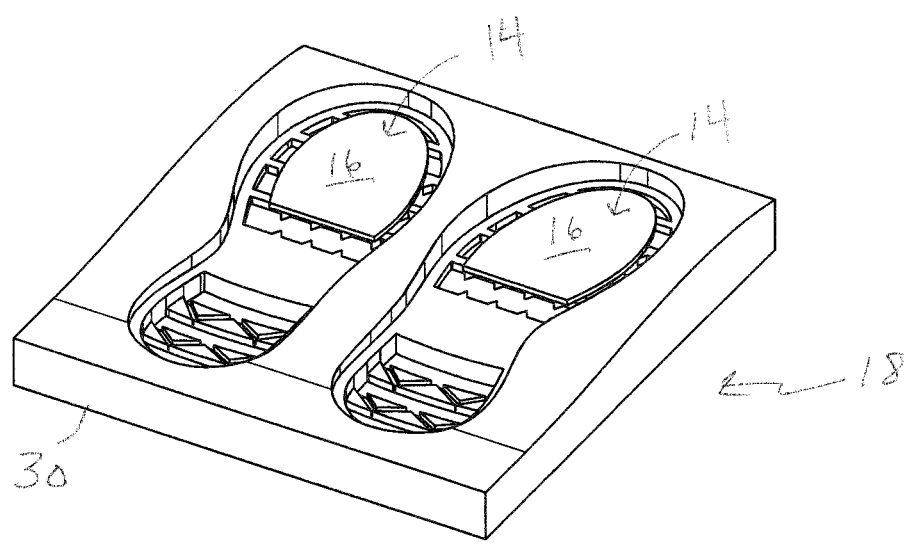
FIG. 4 is a perspective view of the outsole overlay of FIG. 2 positioned within the outsole mold of FIG. 3.
Figure 5:
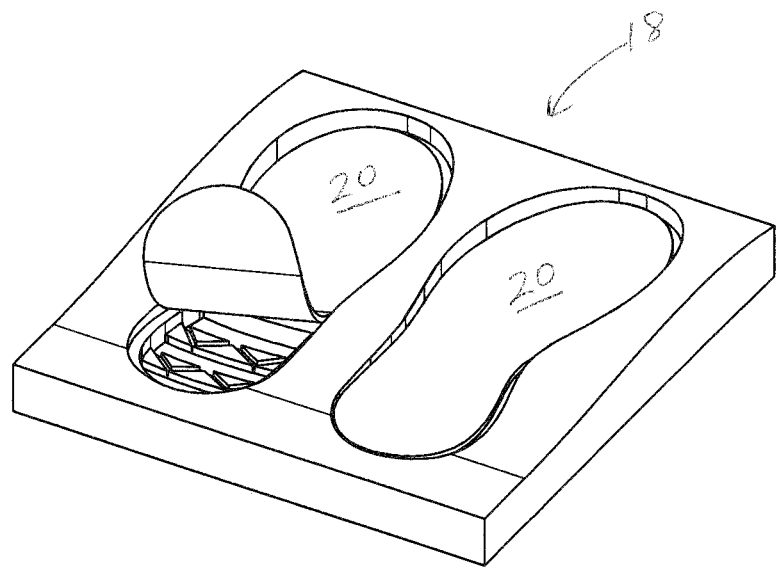
FIG. 5 is a perspective view of a polymer sheet positioned within the outsole mold of FIG. 4 and on top of the outsole overlay
Figure 6:
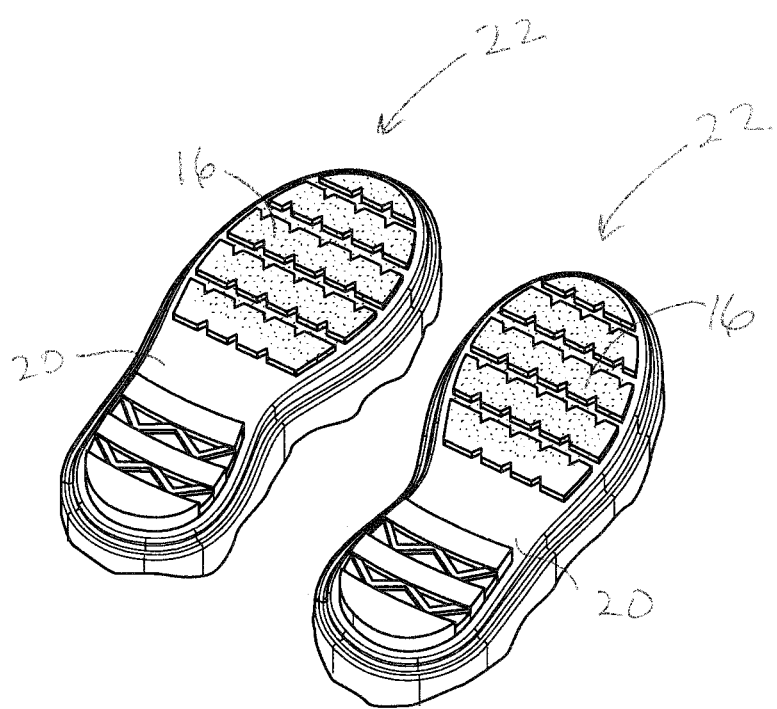
FIG. 6 is a top view of an outsole fabricated from the polymer sheet, the outsole overlay and the outsole mold of FIG. 5 exhibiting the tread pattern of the outsole mold.
Figure 7:
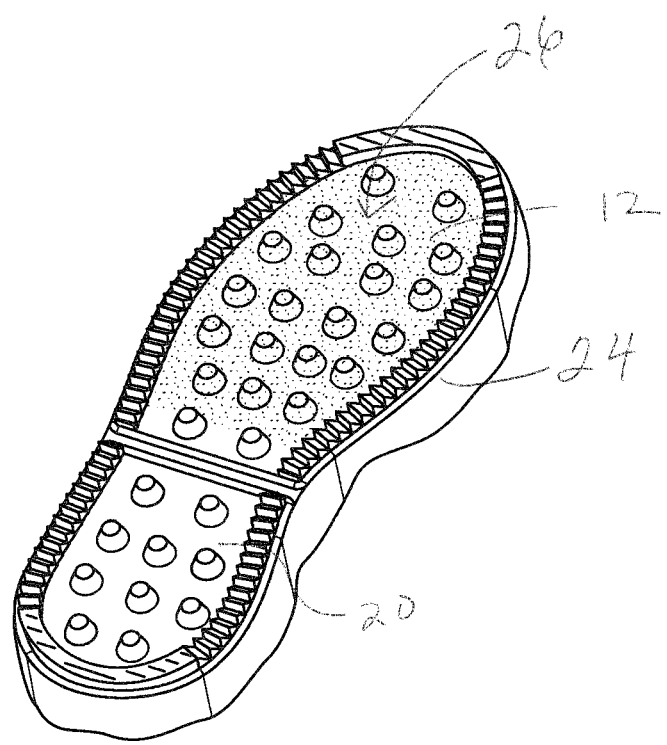
FIG. 7 is a top view of an outsole exhibiting an alternative tread pattern.

The present invention results from the discovery that a footwear tread pattern including relatively sharp edges and other protrusions can be imparted to a cork overlay of an outsole without damaging the overlay by adhering a woven fabric backing to a surface of a cork sheet to form a laminate prior to operatively coupling the laminate to a polymer portion of the outsole. FIG. 1 depicts a laminate 10 fabricated in accordance with the present invention, the laminate including a cork sheet 12 adhered to a woven fabric backing 14. FIG. 2 depicts outsole overlays 16 fabricated from laminate 10 and configured for incorporation into an outsole for providing the outsole with an exposed roughed surface portion. FIG. 3 depicts an outsole mold 18 including an outsole tread pattern 20 for imprinting such tread pattern onto overlay 16 and an outsole surface. FIGS. 4 and 5 depict a method of bonding outsole overlay 16 to a polymer sheet 20 using outsole mold 18 and thereby forming an outsole. FIG. 6 depicts first outsoles 22 made in accordance with the present invention, each of first outsole 22 including outsole tread pattern 20 and outsole overlay 16 on a surface thereof intended for contacting the ground when footwear incorporating the outsole is in use. FIG. 7 depicts a second outsole 24 made in accordance with present invention that exhibits an alternative tread pattern 26. Generally, the present invention is directed to a method of making footwear including the steps of placing outsole overlay 16 into outsole mold 18, placing polymer sheet 20 into the sole mold, compressing overlay 16 and polymer sheet 20 within mold 18 in the presence of heat whereby overlay 16 is bonded with and overlays polymer sheet 20 to form outsoles 22, 24. Thereafter, outsole 22 or 24 is operatively attached to a footwear upper to form a shoe, a boot, a sandal or a wader boot.

More particularly, referring to FIG. 1, laminate 10 is constructed from a sheet of natural cork that is compressed to have a thickness ranging between 0.20 mm to 0.35 mm, 0.215 mm to 0.30 mm or 0.225 mm to 0.275 mm. Preferably, cork sheet 12 has a thickness of 0.25 mm. Adhered to one side of cork sheet 12 is woven fabric backing 14. Backing 14 may be an organic cotton fabric, a cotton fabric, Linen, a lyocell fabric, a leather fabric, a water-based PU leather fabric, elastane fabric, a soy-based fabric, a microfiber fabric, a polyester or a fleece fabric. Alternatively, the backing may be provided as a paper sheet such as a kraft paper sheet. Preferably, woven fabric backing 14 has a thickness of 0.5 mm. Cork sheet 12 may be adhered to fabric backing 14 by any means known in the art including using a water-based glue.

Referring to FIG. 2, laminate 10 is cut into outsole overly 16. The laminate may be cut by any means known in the art including scissors, shears or a rotary cutter. The size and shape of outsole overlay 16 depends on the type of footwear with which the overlay will be used. For example, when it is desired to have heel portion of a shoe exhibit an exposed, roughed surface, the overlay may be heel-shaped or U-shaped. In other instances, the overlay may be shaped to lie underneath and correspond to the shape of a wearer's forefoot or to support distinct sections of a wearer's forefoot such beneath the area of the tibia sesamoid and fibular sesamoid, the area of the tibia sesamoid, fibular sesamoid and first metatarsal phalangeal joint, and the area of Lisfrank's joint. As depicted in FIG. 2, outsole overlay 16 is configured to lie beneath the forefoot.

Referring to FIG. 3, there is depicted outsole mold 18. Outsole mold 18 includes an upper mold portion 28 and a lower mold portion 30. Lower mold portion 30 includes an interior surface having a pair a depressions each including a plurality of protrusions and other edges that together form outsole tread patterns 20. The interior surface of upper mold portion 28 includes a pair of protruding, substantially smooth surfaces corresponding in shape to the pair of depressions formed in the anterior surface of lower mold 30 and configured to fit snuggly therein.

Referring to FIGS. 4 and 5, the method of making footwear in accordance with the present invention includes positioning outsole overlay 16 within a forefoot section of outsole mold 18 and on top of a lower mold portion 30 with cork sheet 12 arranged in direct contact with lower mold portion 30 and outsole tread pattern 20. Woven fabric back 14 is spaced-part from and does not contact lower mold portion 30. Polymer sheet 20 is then positioned within outsole mold 18 and on top of outsole overlay 16. Polymer sheet 20 is generally foot-shaped and extends to cover the entirety of the interior surface of lower mold portion 30 of outsole mold 18, including the entirety of outsole overlay 16. Accordingly, polymer sheet 20 directly contacts woven fabric backing 14 and those portions of the interior surface of lower mold portion 30 that are not covered by outsole overlay 16. Polymer sheet 20 may be fabricated from any outsole polymer material known in the art that is suitable for processing in accordance with the present invention including rubber, thermoplastic polyurethane, thermoplastic rubber, ethylene vinyl acetate, or polyvinyl chloride. Polymer sheet 20 has a thickness in the range of 4.0 mm to 3.0 mm, or 3.75 mm to 3.25 mm. Preferably, polymer sheet 20 has a thickness of 3.5 mm.

Following placement of polymer sheet 20 within mold 18, upper mold portion 28 is arranged to press downward and directly against polymer sheet 20, with the pair of protruding, substantially smooth surfaces of upper mold portion 28 advancing into the pair of depressions of lower mold portion 30, thereby compressing outsole overlay 16 and polymer sheet 20 against one another. The mold is then placed in an oven and heated to a temperature sufficient to cause bonding of polymer sheet 20 to woven fabric backing 14, the flowing of polymer sheet 20 material to fill lower mold portion 30, except for those portions of lower mold portion 30 that are in direct contact with cork sheet 12, and polymer sheet 20 receiving and exhibiting outsole tread pattern 20. The desired oven temperate is dependent upon the material from which polymer sheet 20 is fabricated. For example, when polymer sheet 20 is natural rubber, the oven temperature may be about 180° C. or more, and when the polymer sheet is nitrile, the oven temperature may be 250° C. or more. As pressure and heat are exerted on mold 18, outsole tread pattern 20 is imparted to outsole overlay 16 and polymer sheet 20 without the protrusions of the outsole tread pattern 20 of lower mold portion 30 passing through cork sheet 12 of overlay 16 or otherwise damaging the cork sheet during compression of the overlay and polymer sheet.

After the passage of time, outsole mold 18 is removed from the oven, and polymer sheet 20 and outsole overlay 16 are removed from the mold to provide first outsole 22. As depicted in FIG. 6, each of first outsoles 22 includes outsole overlay 16 positioned in a forefoot section of the outsole and overlaying polymer sheet 20 with overlay 16 exhibiting tread pattern 20 and no holes, tears or other damage. No portion of polymer sheet 20 extends over cork sheet 12. A colored finish may applied to the outsole such that cork 12 and polymer 20 portions exhibit the same color. Following fabrication, outsole 22 is operatively coupled to a footwear upper by means known on the art to form footwear such as shoes, boots, sandals and wader boots. The footwear provides its wearers with improved traction resulting from the overlay's naturally roughened cork surface and tread pattern.

As will be apparent to one skilled in the art, various modifications can be made within the scope of the aforesaid description. Such modifications being within the ability of one skilled in the art form a part of the present invention and are embraced by the claims below.

I claim:

1. A method of making footwear comprising:

providing a laminate including a cork layer and a textile layer, placing the laminate into a sole mold with the cork layer arranged adjacent to and in direct contact with a first surface of the sole mold and the textile layer arranged so that no portion of the textile layer contacts the first surface, the first surface including a plurality of protrusions configured for forming an outsole tread pattern, placing a polymer sheet into the sole mold with the polymer sheet arranged adjacent to and in direct contact with the textile layer, compressing the laminate and the polymer sheet between the first surface and a second surface of the sole mold in the presence of heat whereby the laminate is bonded with and overlays the polymer sheet to form an outsole, and operatively attaching the outsole to a footwear upper to form a footwear item selected from the group consisting of a shoe, a boot, a sandal and a wader boot.

2. The method of claim 1, wherein the cork layer of the laminate of the footwear item displays at least a portion of the outsole tread pattern.

3. The method of claim 1, wherein the plurality of protrusions do not pass through the cork layer of the laminate during compressing of the laminate and the polymer sheet between the first surface and the second surface of the sole mold.

4. The method of claim 1, wherein the polymer sheet is selected from the group consisting of a rubber sheet and a plastic sheet.

5. The method of claim 1, wherein the cork layer of the laminate is a natural cork sheet that is compressed prior to forming the laminate.

6. The method of claim 1, including placing a colored finish on the cork layer.

7. The method of claim 1, including placing the polymer sheet into the sole mold with the polymer sheet arranged adjacent to and in direct contact with the first surface.

8. The method of claim 1, wherein, when the polymer sheet is placed into the sole mold, a contour of the polymer sheet is substantially the same as a contour of the first surface of the sole mold.

9. A method of making footwear comprising:

providing an outsole mold having a first mold surface and a second mold surface, the first mold surface including a plurality of protrusions configured for forming an outsole tread pattern, placing a sheet of compressed natural cork into the outsole mold with the sheet of compressed natural cork adjacent to and in direct contact with the first mold surface, the sheet of compressed natural cork having a textile backing adhered thereto with no portion of the textile backing being in contact with the first mold surface, placing a polymer sheet into the mold with the polymer sheet adjacent to and in direct contact with the textile backing and a portion of the first mold surface, compressing and heating the sheet of compressed natural cork, the textile backing and the polymer sheet between the first mold surface and the second mold surface thereby forming an outsole displaying the outsole tread pattern across the sheet of compressed natural cork and the polymer sheet, and attaching the outsole to a footwear upper to form a footwear item.

10. The method of claim 9, wherein the sheet of compressed natural cork imparts a rough texture surface portion to the outsole.

11. The method of claim 9, wherein the sheet of compressed natural cork is compressed between the first mold surface and the second mold surface forms without tearing the sheet of compressed natural cork.

12. The method of claim 9, wherein the polymer sheet is selected from the group consisting of a rubber sheet and a plastic sheet.

* * * * *